United States Patent
Hirano et al.

(10) Patent No.: US 11,667,749 B2
(45) Date of Patent: Jun. 6, 2023

(54) EPOXY RESIN COMPOSITION FOR FIBER-REINFORCED COMPOSITE MATERIALS, EPOXY RESIN CURED PRODUCT, PREFORM AND FIBER-REINFORCED COMPOSITE MATERIAL

(71) Applicant: TORAY INDUSTRIES, INC., Tokyo (JP)

(72) Inventors: Masanori Hirano, Nagoya (JP); Nobuyuki Tomioka, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/277,923

(22) PCT Filed: Oct. 17, 2019

(86) PCT No.: PCT/JP2019/040855
§ 371 (c)(1),
(2) Date: Mar. 19, 2021

(87) PCT Pub. No.: WO2020/100513
PCT Pub. Date: May 22, 2020

(65) Prior Publication Data
US 2021/0347982 A1   Nov. 11, 2021

(30) Foreign Application Priority Data
Nov. 12, 2018   (JP) .............................. JP2018-212178

(51) Int. Cl.
*C08G 59/24* (2006.01)
*C08G 59/50* (2006.01)
*C08J 5/24* (2006.01)
*C08K 5/13* (2006.01)
*C08K 7/06* (2006.01)
*C08L 63/04* (2006.01)
*C08J 5/04* (2006.01)

(52) U.S. Cl.
CPC ....... *C08G 59/5033* (2013.01); *C08G 59/245* (2013.01); *C08J 5/04* (2013.01); *C08J 5/243* (2021.05); *C08J 5/249* (2021.05); *C08K 5/13* (2013.01); *C08K 7/06* (2013.01); *C08L 63/04* (2013.01); *C08L 2201/08* (2013.01)

(58) Field of Classification Search
None
See application file for complete search history.

(56) References Cited

U.S. PATENT DOCUMENTS

| | | | |
|---|---|---|---|
| 2008/0032154 | A1 | 2/2008 | Akatsuka et al. |
| 2017/0267808 | A1 | 9/2017 | Simmons et al. |
| 2018/0051125 | A1 | 2/2018 | Aoki et al. |
| 2019/0225794 | A1 | 7/2019 | Fukuda et al. |
| 2020/0165398 | A1 | 5/2020 | Hirano et al. |

FOREIGN PATENT DOCUMENTS

| | | |
|---|---|---|
| EP | 3 290 456 A1 | 3/2018 |
| JP | 9-137043 A | 5/1997 |
| JP | 10-204262 A | 8/1998 |
| JP | 2005-298713 A | 10/2005 |
| JP | 2006-52385 A | 2/2006 |
| JP | 2016-84451 A | 5/2016 |
| JP | 2018-502195 A | 1/2018 |
| WO | WO 2006/008984 A1 | 1/2006 |
| WO | WO 2017/221810 A1 | 12/2017 |
| WO | WO 2019/003824 A1 | 1/2019 |

OTHER PUBLICATIONS

International Search Report, issued in PCT/JP2019/040855, PCT/ISA/210, dated Jan. 21, 2020.
Written Opinion of the International Searching Authority, issued in PCT/JP2019/040855, PCT/ISA/237, dated Jan. 21, 2020.
Supplementary European Search Report issued in Patent Application No. 19883356.8 dated Jul. 18, 2022.

*Primary Examiner* — Megan McCulley
(74) *Attorney, Agent, or Firm* — Birch, Stewart, Kolasch & Birch, LLP

(57) ABSTRACT

An epoxy resin composition for fiber-reinforced composite materials which contains 70% by mass or more of a crystalline epoxy resin as component (A) and 10% by mass or more of a crystalline amine curing agent as component (B) based on 100% by mass of the epoxy resin composition. The difference between the melting points of component (A) and component (B) is in a range of 0 to 60° C.

11 Claims, No Drawings

EPOXY RESIN COMPOSITION FOR FIBER-REINFORCED COMPOSITE MATERIALS, EPOXY RESIN CURED PRODUCT, PREFORM AND FIBER-REINFORCED COMPOSITE MATERIAL

TECHNICAL FIELD

The present invention relates to an epoxy resin composition for fiber-reinforced composite materials used for a fiber-reinforced composite material, and an epoxy resin cured product, a preform, and a fiber-reinforced composite material obtained by using the epoxy resin composition.

BACKGROUND ART

In recent years, demand for fiber-reinforced composite materials including a carbon fiber-reinforced composite material has been increasing, especially for aircraft applications and automobile applications. In order to apply the fiber-reinforced composite material to a structural member of an aircraft or the like, excellent properties are indispensable, and in particular, simultaneous achievement of high heat resistance and high toughness are required.

Epoxy resin is usually used as matrix resin of the fiber-reinforced composite material. Among them, a polyfunctional epoxy resin is preferably used because a cured product having a high cross-linking density can be obtained and thus a resin design having a high elastic modulus and high heat resistance can be performed. However, the polyfunctional epoxy resin tends to be a cured resin product having a small deformability and low toughness.

As the matrix resin used in a conventional fiber-reinforced composite material, a liquid or semi-solid resin at room temperature is used in order to sufficiently impregnate a reinforcing-fiber base.

As an example of using a resin that is solid at room temperature, for example, Patent Document 1 discloses a prepreg obtained by adding a solvent to a crystalline epoxy resin and a crystalline amine hardener to form a varnish, impregnating a fiber base, and semi-curing the resin.

Patent Document 2 discloses an epoxy resin composition-impregnated sheet in which an epoxy resin powder composition containing a partially crystalline amine hardener in a crystalline epoxy resin and a crystalline phenol hardener is melted and impregnated into a fibrous base.

PRIOR ART DOCUMENTS

Patent Documents

Patent Document 1: International Publication No. 2008/018364

Patent Document 2: Japanese Patent Laid-open Publication No. 8-325395

SUMMARY OF THE INVENTION

Problems to be Solved by the Invention

In recent years, in order to apply a fiber-reinforced composite material more universally, especially in aircraft applications and automobile applications, a material having a low cost and a low environmental load has been required. However, according to the studies by the inventors, a liquid or semi-solid resin at room temperature used in the conventional fiber-reinforced composite material causes a lot of loss such as remaining of resin in a resin blending facility and a resin injection facility, and therefore, it is difficult-to-handle form. For example, when a prepreg method is applied, the method includes a step of first producing a matrix resin film and then impregnating the produced film with reinforcing fibers; however, when the resin film is produced, an auxiliary material such as a releasable film is often required, and cost tends to increase. In addition, since a liquid or semi-solid resin composition is formed at room temperature, it is difficult to add a large amount of solid components at room temperature.

The material described in Patent Document 1 is inferior in handling a resin composition because a fiber base is impregnated with the resin composition containing a solvent, and is inferior in appearance and mechanical properties when used as a fiber-reinforced composite material because the material is produced by volatilizing the solvent.

In the material described in Patent Document 2, a main component of a hardener is a phenol hardener, and the material is inferior in heat resistance.

An object of the present invention is to provide an epoxy resin composition for fiber-reinforced composite materials which improves the above-mentioned drawbacks of the prior art, is excellent handleability at room temperature, achieves both high heat resistance and high toughness, and is excellent in resin impregnation when used as a reinforcing fiber composite material, and an epoxy resin cured product, a preform and a fiber-reinforced composite material obtained using the epoxy resin composition.

Solutions to the Problems

The present invention for solving the above-mentioned problems has the following constitutions.

(1) An epoxy resin composition for fiber-reinforced composite materials containing a component [A] and a component [B] and containing 10% by mass or more of the component [B] and 70% by mass or more of a crystalline component in 100% by mass of the epoxy resin composition, and a difference in melting point between the component [A] and the component [B] being 0 to 60° C.

Component [A]: Crystalline epoxy resin
Component [B]: Crystalline amine hardener.

(2) An epoxy resin cured product obtained by curing the epoxy resin composition for fiber-reinforced composite materials according to (1) above, a glass transition temperature $X$ (° C.) and a rubbery state elastic modulus $Y$ (MPa) satisfying the following formula (1).

$$0.25X-37 \leq Y \leq 0.25X-19 \qquad (1).$$

(3) A preform having the epoxy resin composition for fiber-reinforced composite materials according to (1) above and a dry reinforcing-fiber base.

(4) A fiber-reinforced composite material obtained by impregnating and curing the preform according to (3) above.

Effects of the Invention

According to the present invention, it is to possible to obtain an epoxy resin composition for fiber-reinforced composite materials which is excellent handleability at room temperature, achieves both high heat resistance and high toughness, and is excellent in resin impregnation when used as a fiber-reinforced composite material, and a preform and a fiber-reinforced composite material obtained using the epoxy resin composition.

EMBODIMENTS OF THE INVENTION

Preferred embodiments of the present invention will be described below.

An epoxy resin composition for fiber-reinforced composite materials of the present invention contains a component [A] and a component [B] and contains 10% by mass or more of the component [B] and 70% by mass or more of a crystalline component in 100% by mass of the epoxy resin composition, and a difference in melting point between the component [A] and the component [B] is 0 to 60° C.

Component [A]: Crystalline epoxy resin
Component [B]: Crystalline amine hardener.

In the present invention, the "epoxy resin composition for fiber-reinforced composite materials" may be simply referred to as "epoxy resin composition".

Component [A] used in the epoxy resin composition of the present invention: the crystalline epoxy resin is a compound having one or more epoxy groups per molecule and having crystallinity. The crystalline epoxy resin may have one or more epoxy groups per molecule, and may be formed of only one type of crystalline compound, or may be a mixture of a plurality of types.

The expression "having crystallinity" means a component having a melting point at a temperature higher than room temperature and being solid at room temperature. The melting point can be determined by differential scanning calorimetry (DSC) according to JIS K 7121: 2012. Temperature rise measurement is performed on a crystalline component in a nitrogen atmosphere, and a top temperature of an endothermic peak in an obtained DSC curve can be obtained as the melting point. The room temperature means 25° C.

Component [A]: by containing the crystalline epoxy resin, it is easy to handle at room temperature, and a rigid skeleton of the crystalline epoxy resin can maintain heat resistance.

As examples of the crystalline epoxy resin preferably used in the present invention, among aromatic glycidyl ethers derived from a phenol compound having a plurality of hydroxyl groups, aliphatic glycidyl ethers derived from an alcohol compound having a plurality of hydroxyl groups, glycidyl amines derived from an amine compound, glycidyl esters derived from a carboxylic acid compound having a plurality of carboxyl groups, and the like, various crystalline epoxy resins are mentioned. Specifically, although not particularly limited, examples thereof include bisphenol type epoxy resin, biphenyl epoxy resin, naphthalene type epoxy resin, anthracene type epoxy resin, hydroquinone type epoxy resin, thioether type epoxy resin, phenylene ether type epoxy resin, tris hydroxyphenylmethane type epoxy resin, terephthalic acid type epoxy resin, isocyanurate epoxy resin, phthalimide type epoxy resin, and tetraphenylethane type epoxy resin.

Among the crystalline epoxy resins, the component [A] preferably contains bifunctional crystalline epoxy resin because a cross-linking density is unlikely to increase when the resin is made into a cured product and it is easy to obtain excellent heat resistance while maintaining a plastic deformation ability. The bifunctional crystalline epoxy resin is a compound having two epoxy groups per molecule and having crystallinity. The content of the bifunctional crystalline epoxy resin in 100% by mass of the component [A] is preferably 70% by mass or more, more preferably 80% by mass or more, and further preferably 90% by mass or more. The upper limit is not particularly limited, but is 100% by mass. In the epoxy resin composition of the present invention, it is particularly preferable that the component [A] is bifunctional crystalline epoxy resin.

Among the bifunctional crystalline epoxy resins, in particular, from the viewpoint of heat resistance and handleability, the component [A] preferably contains one or more crystalline epoxy resins selected from the group consisting of biphenyl epoxy resin and bisphenol type epoxy resin. A total content of biphenyl epoxy resin and bisphenol type epoxy resin in 100% by mass of the component [A] is preferably 70% by mass or more, more preferably 80% by mass or more, and further preferably 90% by mass or more. The upper limit is not particularly limited, but is 100% by mass. In the epoxy resin composition of the present invention, it is particularly preferable that the component [A] is biphenyl epoxy resin, bisphenol type epoxy resin, or bifunctional crystalline epoxy resin.

Component [A]: the crystalline epoxy resin is preferably contained in an amount of 30% by mass or more, more preferably 50% by mass or more, in 100% by mass of the epoxy resin composition. When the crystalline epoxy resin is contained in an amount of 30% by mass or more in 100% by mass of the epoxy resin composition, the handleability of the resin composition at room temperature and the heat resistance at the time of forming a cured product are easily improved. The upper limit is not particularly limited, but is 90% by mass, preferably 80% by mass, and more preferably 70% by mass.

The epoxy resin composition of the present invention may contain other epoxy resins in combination with the component [A]: crystalline epoxy resin. The other epoxy resin is a compound having one or more epoxy groups per molecule, and may be in any form of liquid, semi-solid, or glassy solid at room temperature.

Component [B] used in the epoxy resin composition of the present invention: a crystalline amine hardener is a compound having one or more amino groups per molecule and having crystallinity. The crystalline amine hardener may have one or more amino groups per molecule, and may be formed of only one type of crystalline compound, or may be a mixture of a plurality of types. As described above, the expression "having crystallinity" means a component having a melting point at a temperature higher than room temperature and being solid at room temperature.

Here, the amino group may be any of a tertiary amine having no active hydrogen, a secondary amine having one active hydrogen, and a primary amine containing two active hydrogens, and from the viewpoint of the heat resistance at the time of forming a cured product, the amino group is preferably the primary amine containing two active hydrogens.

Component [B]: the crystalline amine hardener is a hardener for an epoxy resin contained in the epoxy resin composition of the present invention, and a cured product of the resin can be obtained by reacting an epoxy group with an amine. When the crystalline amine hardener is contained, handleability at room temperature is good, the cross-linking density is unlikely to increase at the time of forming a cured product, and the plastic deformation ability can be maintained.

As the crystalline amine hardener preferably used in the present invention, either an aliphatic amine or an aromatic amine can be used, and it is preferable to use an aromatic polyamine from the viewpoint of the heat resistance of the cured product Among the crystalline amine hardeners, the component [B] preferably contains a bifunctional crystalline amine hardener because the cross-linking density is unlikely to increase at the time of forming a cured product and it is easy to obtain excellent heat resistance while maintaining the plastic deformation ability. The bifunctional crystalline amine hardener is a compound having two amino groups per molecule and having crystallinity. The content of the bifunctional crystalline amine hardener in 100% by mass of the component [B] is preferably 70% by mass or more, more preferably 80% by mass or more, and further preferably 90% by mass or more. The upper limit is not particularly limited, but is 100% by mass. In the epoxy resin composition of the present invention, it is particularly preferable that the component [B] is the bifunctional crystalline amine hardener.

Although the aromatic polyamine among the bifunctional crystalline amine hardeners is not particularly limited, diaminodiphenylmethane, diaminodiphenyl sulfone, diaminodiphenyl ether, bisaniline M, bisaniline P, bisaminophenoxybenzene, bisaminophenoxyphenylpropane, bisaminophenoxyphenylsulfone, bisaminophenylfluorene and derivatives thereof, and various isomers thereof can be preferably used.

In particular, from the viewpoint of heat resistance and handleability, it is more preferable to use diaminodiphenylmethane, diaminodiphenylsulfone, bisaminophenylfluorene and derivatives thereof, and various isomers thereof.

Component [B]: the crystalline amine hardener is contained in an amount of 10% by mass or more, preferably 15% by mass or more, more preferably 20% by mass or more, in 100% by mass of the epoxy resin composition. The handleability of the resin composition at room temperature and the heat resistance at the time of forming a cured product are easily improved. When only less than 10% by mass is contained in 100% by mass of the epoxy resin composition, the handleability of the resin composition at room temperature is poor, and the heat resistance at the time of forming a cured product is insufficient. The upper limit is not particularly limited, but is usually about 60% by mass, preferably 50% by mass, and more preferably 40% by mass.

Component [B]: The number of moles of active hydrogen contained in the crystalline amine hardener is preferably 1.05 to 1.70 times the number of moles of an epoxy group contained in the entire epoxy resin composition, and more preferably 1.20 to 1.70 times. Since the number of moles of active hydrogen contained in the crystalline amine hardener is 1.05 to 1.70 times the number of moles of the epoxy group contained in the entire epoxy resin composition, it may be possible to further improve the toughness while maintaining sufficient heat resistance of the cured product.

Such an epoxy resin composition may contain other hardeners in combination with component [B]: crystalline amine hardener. The other hardener may be a compound having an active group capable of reacting with one or more epoxy groups per molecule, and may be in any form of liquid, semi-solid, or glassy solid at room temperature.

Examples of other hardeners that can be used in the present invention include amine-based, phenol-based, acid anhydride-based, and mercaptan-based hardeners. Examples of other amine-based hardeners include dicyandiamide, aromatic polyamine, aliphatic amine, aminobenzoic acid esters, thiourea-containing amine, and hydrazide, which are not crystalline amine hardeners. Examples of other phenolic hardeners include bisphenol, phenol novolac resin, cresol novolac resin, and polyphenol compound. Examples of other acid anhydride-based hardeners include phthalic anhydride, maleic anhydride, succinic anhydride, and carboxylic anhydride. Examples of other mercaptan-based hardeners include polymercaptan and polysulfide resin.

The epoxy resin composition of the present invention preferably further contains a component [C]: a crystalline curing accelerator. The crystalline curing accelerator is a component that promotes smooth curing reaction through formation of a bond between the epoxy resin and the hardener, and is a compound having crystallinity. When the crystalline curing accelerator is contained, it may be possible to shorten a curing time and improve productivity. As described above, the expression "having crystallinity" means a component having a melting point at a temperature higher than room temperature and being solid at room temperature.

Component [C]: Examples of the crystalline curing accelerator include imidazoles, tertiary amine, organic phosphorus compound, urea compound, phenol compound, ammonium salt, and sulfonium salt.

In particular, from the viewpoint of curability and stability, organic phosphorus compounds, urea compounds and phenol compounds are preferable.

Component [C]: The crystalline curing accelerator is preferably contained in an amount of 0.1 to 10% by mass, more preferably 0.5 to 5% by mass, in 100% by mass of the epoxy resin composition. When the crystalline curing accelerator is contained in an amount of 0.1 to 10% by mass in 100% by mass of the epoxy resin composition, it may be possible to shorten the curing time while ensuring stability of the epoxy resin composition at room temperature.

The epoxy resin composition of the present invention contains 70% by mass or more of a crystalline component in 100% by mass of the epoxy resin composition. The content of the crystalline component is 70% by mass or more and 100% by mass or less, preferably 80% by mass or more and 100% by mass or less, and further preferably 90% by mass or more and 100% by mass or less in 100% by mass of the epoxy resin composition. Here, when a plurality of different crystalline components are contained (specifically, the component [A], the component [B], and if contained, the component [C], and in addition, when the component has a melting point at a temperature higher than room temperature and contains a solid component at room temperature), the content of the crystalline component means a total content thereof. When the content of the crystalline component is 70% by mass or more, the handleability of the epoxy resin composition at room temperature is excellent, and, at the same time, impregnating property into dry reinforcing fibers is excellent when heating and melting are performed.

In the epoxy resin composition of the present invention, the difference in melting point between the component [A] and the component [B] is 0 to 60° C., preferably 0 to 50° C., and more preferably 0 to 40° C. When the difference in melting point between the component [A] and the component [B] is higher than 60° C., melt-stability of the components differs when the composition is heated, so that the obtained cured product becomes non-uniform. When the component [A] or the component [B] has a plurality of melting points, the difference refers to a difference in melting point in combination with the largest difference in melting point.

The epoxy resin composition of the present invention preferably has a complex viscosity η* at 25° C. of $1 \times 10^7$ Pa·s or more, and more preferably $3 \times 10^7$ Pa·s or more. When the complex viscosity η* at 25° C. is $1 \times 10^7$ Pa·s or more, the composition does not easily flow at room temperature, and the handleability is easily improved. The complex viscosity η* of the epoxy resin composition can be measured by setting a resin sample on a parallel plate and using a dynamic viscoelasticity measuring device.

A method of preparing the epoxy resin composition of the present invention is not particularly limited, and for example, the constituent components may be temporarily heated and compatibilized, and then cooled and recrystallized to obtain the epoxy resin composition. Alternatively, the constituent components may be made into powder form, and a powder may be crimped to the epoxy resin composition.

An epoxy resin cured product of the present invention is an epoxy resin cured product obtained by curing the epoxy resin composition of the present invention, and a glass transition temperature X (° C.) and a rubbery state elastic modulus Y (MPa) satisfy the following formula (1).

$$0.25X-37 < Y \leq 0.25X-19 \tag{1}.$$

When the rubbery state elastic modulus Y satisfies the above formula (1), the epoxy resin cured product has the plastic deformation ability and easily exhibits sufficient resin toughness. As a means for satisfying the above formula (1), for example, when the epoxy resin composition contains the component [A]: crystalline epoxy resin and the component [B]: crystalline amine hardener, the above formula (1) can be easily satisfied by making it easy to increase the heat resistance of the epoxy resin cured product, that is, the value of X. For example, by using a bifunctional component as the component [A] and the component [B], cross-linking of the cured product is reduced, and the value of the rubbery state elastic modulus Y is lowered, so that the above formula (1) can be more easily satisfied.

The epoxy resin composition of the present invention is preferably used as a preform in combination with a dry reinforcing-fiber base. A preform of the present invention has the epoxy resin composition for fiber-reinforced composite materials of the present invention and the dry reinforcing-fiber base. That is, the preform of the present invention is in a form in which the epoxy resin composition is in direct or indirect contact with a surface of the dry reinforcing-fiber base. For example, the epoxy resin composition may be present on the dry reinforcing-fiber base, or the dry reinforcing-fiber base may be present on the epoxy resin composition. Alternatively, the same may be laminated. The epoxy resin composition and the dry reinforcing-fiber base may be in a form of indirect contact with each other via a film, a non-woven fabric or the like.

In the present invention, various organic and inorganic fibers such as glass fiber, aramid fiber, carbon fiber, and boron fiber are used for the dry reinforcing-fiber base. Among these fibers, the carbon fiber is preferably used because it is possible to obtain a fiber-reinforced composite material which is lightweight but has excellent mechanical properties such as strength and elastic modulus.

In the present invention, the dry reinforcing-fiber base refers to a reinforcing-fiber base in a state in which the reinforcing-fiber base is not impregnated with the matrix resin. Therefore, the preform of the present invention is different from the prepreg in which the reinforcing fiber is impregnated with the matrix resin. However, the dry reinforcing-fiber base in the present invention may be impregnated with a small amount of binder. The binder is a component that binds between layers of the laminated dry reinforcing-fiber base, and a component formed from a thermoplastic resin that does not contain a hardener or a catalyst is preferable. The fiber-reinforced composite material of the present invention, which will be described later, is not called a dry reinforcing-fiber because the fiber-reinforced composite material is in a state of being impregnated with the epoxy resin composition which is cured.

The dry reinforcing-fiber in the present invention may be either a short fiber or a continuous fiber, and both may be used in combination. In order to obtain a fiber-reinforced composite material having a high fiber volume fraction (high Vf), continuous fibers are preferably used.

Although the dry reinforcing-fiber in the present invention may be used in the form of a strand, a dry reinforcing-fiber base obtained by processing the dry reinforcing-fiber in the form of mat, woven fabric, knit fabric, braid, one-directional sheet or the like is preferably used. In particular, woven fabrics are preferably used because it serves to easily obtain fiber-reinforced composite material with a high Vf and it is high in handleability.

When the preform of the present invention is used as a fiber-reinforced composite material, in order for the fiber-reinforced composite material to easily have a high specific strength or a high specific modulus, the fiber volume fraction Vf of the reinforcing fiber is preferably in a range of 30 to 85%, and more preferably a range of 35 to 70%. The fiber volume fraction Vf of the fiber-reinforced composite material as referred to herein is a value defined and determined as follows according to ASTM D3171 (1999). That is, the fiber volume fraction Vf refers to a value measured in a state after the dry reinforcing-fiber base is impregnated with the epoxy resin composition and the composition is cured. Thus, the fiber volume fraction Vf of the fiber-reinforced composite material can be calculated as the following formula (2) from thickness h of the fiber-reinforced composite material.

$$\text{Fiber volume fraction } Vf\,(\%) = (Af \times N)/(\rho f \times h \times 10) \tag{2}$$

Af: mass per m² (g/m²) of a sheet of dry reinforcing-fiber base

N: number of laminated dry reinforcing-fiber bases (number)

ρf: density (g/cm³) of dry reinforcing-fiber base h: thickness (mm) of fiber-reinforced composite material (test piece)

If the mass per m² of a sheet of dry reinforcing-fiber base, Af, number of laminated dry reinforcing-fiber bases, N, and density of dry reinforcing-fiber base, ρf, are not known, the combustion method, nitric acid decomposition method, or sulfuric acid decomposition method based on JIS K 7075 (1991) is used to determine the fiber volume fraction of fiber-reinforced composite material. As the density of reinforcing fiber to be used in this case, a value measured according to JIS R 7603 (1999) is used.

As a specific method of measuring the thickness h of the fiber-reinforced composite material, it is preferable that, as described in JIS K 7072 (1991), the thickness h be measured using a micrometer as specified in JIS B 7502 (1994) or any other device with equivalent or greater accuracy. If the thickness of the fiber-reinforced composite material cannot be measured due to a complex shape, it is desirable that samples (samples with a degree of suitability for measurement in terms of shape and size) are cut out of the fiber-reinforced composite material and subjected to a measurement.

The fiber-reinforced composite material of the present invention is obtained by impregnating and curing the preform of the present invention. That is, the fiber-reinforced composite material of the present invention is obtained by impregnating the dry reinforcing-fiber base with the epoxy resin composition of the present invention and curing the composition.

Examples of a method of producing the fiber-reinforced composite material of the present invention include a method including a molding step of molding while impregnating the reinforcing fibers with the epoxy resin composition, and a curing step of curing to obtain a fiber-reinforced composite material.

In the molding step in the method of producing the fiber-reinforced composite material of the present invention, various methods such as a press forming method, a film bag molding method, and an autoclave molding method can be used. Among these methods, the press forming method and the film bag molding method are particularly preferably used from the viewpoint of productivity and flexibility in a shape of a molding.

As the film bag molding method, there is preferably exemplified a method of disposing a preform composed of an epoxy resin composition and a dry reinforcing-fiber base between a rigid open mold and a flexible film, and vacuum-sucking the inside to heat-mold while applying atmospheric pressure, or a method of heat-molding while performing heat molding, or a method of heat-molding while pressing with a gas or liquid.

An example of the method of producing the fiber-reinforced composite material of the present invention will be described using the press forming method. The fiber-reinforced composite material of the present invention can be produced by, for example, placing a preform for fiber-reinforced composite materials composed of an epoxy resin composition and a dry reinforcing-fiber base in a molding die heated to a specific temperature, then pressing and heating by a press to melt the resin composition, impregnating the reinforcing-fiber base with the composition, and then curing the composition as it is.

It is preferable that the glass transition temperature X (° C.) and the rubbery state elastic modulus Y (MPa) of the epoxy resin cured product contained in the fiber-reinforced composite material of the present invention satisfy the above formula (1). By satisfying the above formula (1), it becomes easy to obtain a fiber-reinforced composite material having excellent heat resistance and impact resistance property.

The temperature of the molding die is preferably set to a temperature equal to or higher than a temperature at which the complex viscosity $\eta^*$ of the resin composition used decreases to $1 \times 10^1$ Pa·s from the viewpoint of impregnating property into the dry reinforcing-fiber base.

EXAMPLES

Hereinafter, the present invention will be described in more detail with reference to Examples. However, the present invention is not limited by these Examples.

<Input Resin Material>

The following input resin materials were used to prepare an epoxy resin composition in each Example. In Table 1-1 and Table 1-2, the contents of the epoxy resin compositions are expressed in "parts by mass" unless otherwise specified.

1. Component [A]: Crystalline Epoxy Resin

"jER (registered trademark)" YX4000 (manufactured by Mitsubishi Chemical Corporation): biphenyl epoxy resin, melting point=105° C.

"jER (registered trademark)" YL6121H (manufactured by Mitsubishi Chemical Corporation): biphenyl epoxy resin, melting point=120° C.

YSLV-80DE (manufactured by Nippon Steel & Sumikin Chemical Co., Ltd.): phenylene ether type epoxy resin, melting point=82° C.

YSLV-80XY (manufactured by Nippon Steel & Sumikin Chemical Co., Ltd.): bisphenol F epoxy resin, melting point=81° C.

YDC-1312 (manufactured by Nippon Steel & Sumikin Chemical Co., Ltd.): hydroquinone type epoxy resin, melting point=142° C.

"DENACOL (registered trademark)" EX-711 (manufactured by Nagase ChemteX Corporation): terephthalic acid type epoxy resin, melting point=106° C.

TEPIC-S (manufactured by Nissan Chemical Corporation): isocyanurate epoxy resin, melting point=110° C.

2. Other Epoxy Resins

YD-128 (manufactured by Nippon Steel & Sumikin Chemical Co., Ltd.): bisphenol A epoxy resin, liquid "jER" (registered trademark) 1001 (manufactured by Mitsubishi Chemical Corporation): bisphenol A epoxy resin, glassy solid.

3. Component [B]: Crystalline Amine Hardener.

"Lonzacure (registered trademark)" M-DEA (manufactured by Lonza): 4,4'-diamino-3,3',5,5'-tetraethyldiphenyl-methane, melting point=89° C.

3,3'-DAS (manufactured by Konishi Chemical Inc Co., Ltd.): 3,3'-diaminodiphenyl sulfone, melting point=170° C.

Bisaniline M (manufactured by Mitsui Fine Chemicals, Inc Co., Ltd.): 1,3-bis[2-(4-aminophenyl)-2-propyl]benzene, melting point=114° C.

"Lonzacure (registered trademark)" CAF (manufactured by Lonza): 9,9-bis(4-amino-3-chlorophenyl) fluorene, melting point=201° C.

4. Other Hardeners

Bisphenol A (manufactured by Kanto Chemical Co., Inc.): 4,4'-isopropyridene diphenol, melting point=158° C.

5. Component [C]: Crystalline Curing Accelerator

DIC-TBC (manufactured by DIC Corporation): 4-tert-butylcatechol, melting point=53° C.

<Preparation of Epoxy Resin Composition>

The epoxy resin, the hardener, and the curing accelerator, of which the raw materials and compounding ratios were shown in Table 1-1 and Table 1-2, were melted and mixed homogeneously by stirring while heating under temperature/time conditions under which a curing reaction did not proceed substantially, cast into a mold, and then quenched to prepare the epoxy resin composition.

<Measurement of Melting Point of Crystalline Component>

The melting point of each input resin material used was measured by differential scanning calorimetry (DSC) according to JIS K 7121: 2012. The measure equipment used was Pyrisl DSC (manufactured by Perkin Elmer). About 10 mg of crystalline component was sampled on an aluminum sample pan and subjected to measurement in a nitrogen atmosphere at a temperature ramp rate of 10° C./min. In the obtained DSC curve, the top temperature of the endothermic peak due to melting of the components was measured as the melting point.

<Measurement of Complex Viscosity $\eta^*$ of Epoxy Resin Composition>

The epoxy resin composition prepared as described above was used as a sample and measured by dynamic viscoelasticity measurement. The measure equipment used was ARES-G2 (manufactured by TA Instruments). The sample was set on an 8 mm parallel plate so as to have a thickness of 1 mm, a traction cycle of 0.5 Hz was applied, and measurement was performed at 25° C. to measure the complex viscosity $\eta^*$.

<Measurement of Curing Time of Epoxy Resin Composition>

The epoxy resin composition prepared as described above was used as a sample, about 5 g of the sample was put into a stage heated to 180° C. using a thermosetting measurement device ATD-1000 (manufactured by Alpha Technologies), and dynamic viscoelasticity measurement was performed at a frequency of 1.0 Hz with a strain of 1.0%. At this time, a time required for the complex viscosity η* to reach $1.0\times10^7$ Pa·s was defined as the curing time. When the complex viscosity η* did not reach $1.0\times10^7$ Pa·s, a time when an increase in the complex viscosity η* was saturated was defined as the curing time.

<Measurement of Glass Transition Temperature X and Rubbery State Elastic Modulus Y of Epoxy Resin Cured Product>

The epoxy resin composition prepared as described above was heated and melted, and poured into a mold set to have a thickness of 2 mm. Curing was performed at a temperature of 180° C. for 4 hours to provide a resin cured product with a thickness of 2 mm. Then, the resulting resin cured product plate was cut to prepare a test piece with a width of 10 mm and a length of 40 mm, a dynamic viscoelasticity measuring device (ARES: manufactured by TA Instruments) was used, and the test piece was set to a solid twisting jig and subjected to measurement over a temperature range from 30° C. to 300° C. under the conditions of a temperature ramp rate of 5° C./min, a frequency of 1 Hz, and a strain of 0.1%. At this time, the glass transition temperature was the temperature where the tangent drawn in the glass region and the tangent drawn in the glass transition region intersect each other in the graph between storage modulus and temperature obtained above. The rubbery state elastic modulus was the storage modulus at a temperature 50° C. higher than the glass transition temperature in the graph between storage modulus and temperature obtained above.

<Measurement of Resin Toughness of Epoxy Resin Cured Product>

The epoxy resin composition prepared as described above was heated and melted, and poured into a mold set to have a thickness of 6 mm. Curing was performed at a temperature of 180° C. for 4 hours to provide a resin cured product with a thickness of 6 mm. This resin cured product was cut into a size of 12.7×150 mm to obtain a test piece. Processing and experiments of the test piece were carried out in accordance with ASTM D5045 (1999) using an Instron type universal tester (manufactured by Instron Corporation). Initial introduction of pre-cracks into the test piece was performed in the following manner: the edge of a razor cooled to the temperature of liquid nitrogen was brought into contact with the test piece, and an impact was applied to the razor with a hammer. Toughness of the resin cured product as referred to herein is a critical stress expansion factor in deformation Mode I (opening type).

<Production of Fiber-Reinforced Composite Material>

A fiber-reinforced composite material was produced by the following press forming method. In a metal mold having a plate-shaped cavity measuring 350 mm×700 mm×2 mm provided and held at a predetermined temperature (molding temperature), a preform in which 290 g of the epoxy resin composition prepared as described above was placed was set on a base with nine pieces of the carbon-fiber woven fabric CO6343 (carbon fiber: T300-3K, structure: plain weave, basis weight: 198 g/m², manufactured by Toray Industries, Inc.) laminated as the dry reinforcing-fiber base. After that, mold-clamping was performed using press equipment. At this time, the inside of the metal mold was lowered to atmospheric pressure −0.1 MPa using a vacuum pump, and then pressed at a maximum pressure of 4 MPa. The temperature of the metal mold was set to a temperature 10° C. higher than the temperature of the highest melting point of the crystalline components contained in the thermosetting resin composition used. However, if the temperature was 180° C. or lower, the temperature was set to 180° C. Four hours after pressing began, the metal mold was opened, and a fiber-reinforced composite material was obtained by demolding.

<Resin Impregnating Property Into Dry Reinforcing-Fiber Base>

When the above-mentioned fiber-reinforced composite material was produced, the impregnating property of the resin into the dry reinforcing-fiber base was compared and evaluated in the following three grades, based on the void content in the fiber-reinforced composite material.

When the void content in the fiber-reinforced composite material was less than 1% and therefore substantially no void was present, it was evaluated as "A". When the void content in the fiber-reinforced composite material was 1% or more though the appearance of the fiber-reinforced composite material did not indicate the presence of unimpregnated regions, it was evaluated as "B". When the appearance of the fiber-reinforced composite material indicated the presence of unimpregnated regions, it was evaluated as "C".

For the void content in the fiber-reinforced composite material, a surface obtained by smoothly polishing a cross-section arbitrarily selected with the smoothly-polished fiber-reinforced composite material was observed with an oblique optical microscope, and the void content was calculated from an area ratio of the void in the fiber-reinforced composite material.

Example 1

As shown in Table 1-1, 100 parts by mass of biphenyl epoxy resin "jER (registered trademark)" YX4000, and 42 parts by mass of 4,4'-diamino-3,3',5,5'-tetraethyldiphenylmethane "Lonzacure (registered trademark)" M-DEA were melted and mixed, then quenched to room temperature, and crystallized to prepare an epoxy resin composition. This resin composition had a complex viscosity at 25° C. of $3.0\times10^8$ Pa·s, did not deform even when lifted by hand, and was excellent in handleability at room temperature. The glass transition temperature of the epoxy resin cured product obtained by curing this resin composition was 187° C., and the epoxy resin cured product had excellent heat resistance. The resin toughness of the cured product was 0.8 MPa·m$^{1/2}$, and was thus sufficient. The fiber-reinforced composite material produced by using the preform composed of this resin composition and the dry reinforcing-fiber base had no unimpregnated region on the surface and almost no internal voids, and was excellent in impregnating property.

Example 2

As shown in Table 1-1, an epoxy resin composition was prepared in the same manner as in Example 1 except that the component [A] used was 100 parts by mass of the biphenyl epoxy resin "jER (registered trademark)" YL6121H, and the component [B] used was 35 parts by mass of 3,3'-diaminodiphenyl sulfone "3,3'-DAS". This resin composition had a complex viscosity at 25° C. of $3.0\times10^8$ Pa·s, and was excellent in handleability at room temperature. The glass transition temperature of the epoxy resin cured product obtained by curing this resin composition was 181° C., the resin toughness was 1.1 MPa·m$^{1/2}$, and the epoxy resin cured product had excellent heat resistance and resin toughness. The fiber-reinforced composite material produced by using the preform composed of this resin composition and the dry reinforcing-fiber base was excellent in impregnating property.

Example 3

As shown in Table 1-1, an epoxy resin composition was prepared in the same manner as in Example 1 except that the component [A] used was 100 parts by mass of the phenylene ether type epoxy resin "YSLV-80DE", and the component [B] used was 45 parts by mass of 4,4'-diamino-3,3',5,5'-tetraethyldiphenylmethane "Lonzacure (registered trademark)" M-DEA. This resin composition had a complex viscosity at 25° C. of 3.0×10$^8$ Pa·s, and was excellent in handleability at room temperature. The glass transition temperature of the epoxy resin cured product obtained by curing this resin composition was 140° C., the resin toughness was 0.6 MPa·m$^{1/2}$, and the epoxy resin cured product had sufficient heat resistance and resin toughness. The fiber-reinforced composite material produced by using the preform composed of this resin composition and the dry reinforcing-fiber base was excellent in impregnating property.

Example 4

As shown in Table 1-1, an epoxy resin composition was prepared in the same manner as in Example 1 except that the component [A] used was 100 parts by mass of the bisphenol F epoxy resin "YSLV-80XY", and the component [B] used was 40 parts by mass of 4,4'-diamino-3,3',5,5'-tetraethyldiphenylmethane "Lonzacure (registered trademark)" M-DEA. This resin composition had a complex viscosity at 25° C. of 3.0×10$^8$ Pa·s, and was excellent in handleability at room temperature. The glass transition temperature of the epoxy resin cured product obtained by curing this resin composition was 176° C., the resin toughness was 0.7 MPa·m$^{1/2}$, and the epoxy resin cured product had sufficient heat resistance and resin toughness. The fiber-reinforced composite material produced by using the preform composed of this resin composition and the dry reinforcing-fiber base was excellent in impregnating property.

Example 5

As shown in Table 1-1, an epoxy resin composition was prepared in the same manner as in Example 1 except that the component [A] used was 100 parts by mass of the hydroquinone type epoxy resin "YDC-1312", and the component [B] used was 44 parts by mass of 4,4'-diamino-3,3',5,5'-tetraethyldiphenylmethane "Lonzacure (registered trademark)" M-DEA. This resin composition had a complex viscosity at 25° C. of 3.0×10$^8$ Pa·s, and was excellent in handleability at room temperature. The glass transition temperature of the epoxy resin cured product obtained by curing this resin composition was 180° C., the resin toughness was 0.7 MPa·m$^{1/2}$, and the epoxy resin cured product had sufficient heat resistance and resin toughness. The fiber-reinforced composite material produced by using the preform composed of this resin composition and the dry reinforcing-fiber base had a slightly large difference in melting points between the components [A] and [B], so that sufficient impregnating property was obtained although the melt-stability of the components differed during impregnation.

Example 6

As shown in Table 1-1, an epoxy resin composition was prepared in the same manner as in Example 1 except that the component [A] used was 100 parts by mass of the terephthalic acid type epoxy resin "EX-711", and the component [B] used was 53 parts by mass of 4,4'-diamino-3,3',5,5'-tetraethyldiphenylmethane "Lonzacure (registered trademark)" M-DEA. This resin composition had a complex viscosity at 25° C. of 3.0×10$^8$ Pa·s, and was excellent in handleability at room temperature. The glass transition temperature of the epoxy resin cured product obtained by curing this resin composition was 179° C., the resin toughness was 0.8 MPa·m$^{1/2}$, and the epoxy resin cured product had sufficient heat resistance and resin toughness. The fiber-reinforced composite material produced by using the preform composed of this resin composition and the dry reinforcing-fiber base was excellent in impregnating property.

Example 7

As shown in Table 1-1, an epoxy resin composition was prepared in the same manner as in Example 1 except that the component [A] used was 100 parts by mass of the isocyanurate epoxy resin "TEPIC-S", and the component [B] used was 79 parts by mass of 4,4'-diamino-3,3',5,5'-tetraethyldiphenylmethane "Lonzacure (registered trademark)" M-DEA. This resin composition had a complex viscosity at 25° C. of 3.0×10$^8$ Pa·s, and was excellent in handleability at room temperature. The glass transition temperature of the epoxy resin cured product obtained by curing this resin composition was 263° C., the resin toughness was 0.6 MPa·m$^{1/2}$, and the epoxy resin cured product had excellent heat resistance and sufficient resin toughness. The fiber-reinforced composite material produced by using the preform composed of this resin composition and the dry reinforcing-fiber base was excellent in impregnating property.

Example 8

As shown in Table 1-1, an epoxy resin composition was prepared in the same manner as in Example 1 except that the component [A] used was 100 parts by mass of the biphenyl epoxy resin "jER (registered trademark)" YL6121H, and the component [B] used was 49 parts by mass of 1,3-bis[2-(4-aminophenyl)-2-propyl]benzene "Bisaniline M". This resin composition had a complex viscosity at 25° C. of 3.0×10$^8$ Pa·s, and was excellent in handleability at room temperature. The glass transition temperature of the epoxy resin cured product obtained by curing this resin composition was 181° C., the resin toughness was 1.2 MPa·m$^{1/2}$, and the epoxy resin cured product had excellent heat resistance and resin toughness. The fiber-reinforced composite material produced by using the preform composed of this resin composition and the dry reinforcing-fiber base was excellent in impregnating property.

Example 9

As shown in Table 1-1, an epoxy resin composition was prepared in the same manner as in Example 1 except that the component [A] used was 100 parts by mass of the hydroquinone type epoxy resin "YDC-1312", and the component [B] used was 59 parts by mass of 9,9-bis(4-amino-3-chlorophenyl)fluorene "Lonzacure (registered trademark)" CAF. This resin composition had a complex viscosity at 25° C. of 3.0×10$^8$ Pa·s, and was excellent in handleability at room temperature. The glass transition temperature of the epoxy resin cured product obtained by curing this resin composition was 200° C., the resin toughness was 0.9 MPa·m$^{1/2}$, and the epoxy resin cured product had excellent heat resistance and resin toughness. The fiber-reinforced composite material produced by using the preform composed of this resin composition and the dry reinforcing-fiber base had a slightly large difference in melting points between the components [A] and [B], so that sufficient impregnating property was obtained although the melt-stability of the components differed during impregnation.

Examples 10 to 13

As shown in Table 1-2, an epoxy resin composition was prepared in the same manner as in Example 1 except that the component [A] used was 100 parts by mass of the biphenyl epoxy resin "jER (registered trademark)" YL6121H, the component [B] used was 3,3'-diaminodiphenyl sulfone "3,3'-DAS", and the amount of the component [B] added was changed such that the number of moles of active hydrogen contained in the component [B] was 1.1 times (Example 9), 1.25 times (Example 10), 1.5 times (Example 11), and 1.75 times (Example 12), respectively, the number of moles of the epoxy group contained in the entire epoxy resin composition. These resin compositions had a complex viscosity at 25° C. of $3.0 \times 10^8$ Pa·s, and were excellent in handleability at room temperature. The glass transition temperature of the epoxy resin cured product obtained by curing this resin composition was 179° C., 169° C., 155° C., and 135° C., respectively. The resin toughness was 1.2 MPa·$m^{1/2}$, 1.5 MPa·$m^{1/2}$, 1.3 MPa·$m^{1/2}$, and 1.0 MPa·$m^{1/2}$, respectively, and the epoxy resin cured product had more than sufficient heat resistance and resin toughness. The fiber-reinforced composite material produced by using the preform composed of this resin composition and the dry reinforcing-fiber base was excellent in impregnating property.

Examples 14, 15

As shown in Table 1-2, an epoxy resin composition was prepared in the same manner as in Example 1 except that the component [A] used was 100 parts by mass of the biphenyl epoxy resin "jER (registered trademark)" YX4000, the component [B] used was 42 parts by mass of 4,4'-diamino-3,3', 5,5'-tetraethyldiphenylmethane "Lonzacure (registered trademark)" M-DEA, and 3 parts by mass (Example 13) or 5 parts by mass (Example 14) of 4-tert-butylcatechol "DIC-TBC" as the component [C] was added. These resin compositions had a complex viscosity at 25° C. of $3.0 \times 10^8$ Pa·s, and were excellent in handleability at room temperature. The glass transition temperature of the epoxy resin cured product obtained by curing this resin composition was 180° C. and 170° C., respectively. The resin toughness in each Example was 0.7 MPa·$m^{1/2}$, and the epoxy resin cured product had sufficient heat resistance and resin toughness. By adding the component [C], the curing time of the resin composition was 184 minutes and 178 minutes, respectively, and the curing time was significantly shortened as compared with 226 minutes in a case where the component [C] was not added. The fiber-reinforced composite material produced by using the preform composed of the dry reinforcing-fiber base using this resin composition was excellent in impregnating property.

Example 16

As shown in Table 1-2, an epoxy resin composition was prepared in the same manner as in Example 1 except that the component [A] used was 80 parts by mass of the biphenyl epoxy resin "jER (registered trademark)" YX4000, the other epoxy resin was 20 parts by mass of the bisphenol A epoxy resin "jER" (registered trademark) 1001, and the component [B] was 37 parts by mass of 4,4'-diamino-3,3',5,5'-tetraethyldiphenylmethane "Lonzacure (registered trademark)" M-DEA. These resin compositions had a complex viscosity at 25° C. of $3.0 \times 10^8$ Pa·s, and were excellent in handleability at room temperature. The glass transition temperature of the epoxy resin cured product obtained by curing this resin composition was 180° C., the resin toughness was 0.8 MPa·$m^{1/2}$, and the epoxy resin cured product had sufficient heat resistance and resin toughness. The fiber-reinforced composite material produced by using the preform composed of the dry reinforcing-fiber base using this resin composition was excellent in impregnating property.

Example 17

As shown in Table 1-2, an epoxy resin composition was prepared in the same manner as in Example 1 except that the component [A] used was 70 parts by mass of the biphenyl epoxy resin "jER (registered trademark)" YX4000, the other epoxy resin was 30 parts by mass of the bisphenol A epoxy resin "jER" (registered trademark) 1001, and the component [B] was 34 parts by mass of 4,4'-diamino-3,3',5,5'-tetraethyldiphenylmethane "Lonzacure (registered trademark)" M-DEA. These resin compositions had a complex viscosity at 25° C. of $2.0 \times 10^8$ Pa·s, and were excellent in handleability at room temperature. The glass transition temperature of the epoxy resin cured product obtained by curing this resin composition was 169° C., the resin toughness was 0.8 MPa·$m^{1/2}$, and the epoxy resin cured product had sufficient heat resistance and resin toughness. The fiber-reinforced composite material produced by using the preform composed of the dry reinforcing-fiber base using this resin composition had sufficient impregnating property.

Comparative Example 1

As shown in Table 1-2, an epoxy resin composition was prepared in the same manner as in Example 1 except that the component [A] used was 100 parts by mass of the phenylene ether type epoxy resin "YSLV-80DE", and the component [B] used was 35 parts by mass of 3,3'-diaminodiphenyl sulfone "3,3'-DAS". This resin composition had a complex viscosity at 25° C. of $3.0 \times 10^8$ Pa·s, and was excellent in handleability at room temperature. The glass transition temperature of the epoxy resin cured product obtained by curing this resin composition was 148° C., the resin toughness was 0.6 MPa·$m^{1/2}$, and the epoxy resin cured product was slightly inferior in resin toughness. The fiber-reinforced composite material produced by using the preform composed of this resin composition and the dry reinforcing-fiber base had a large difference in melting points between the components [A] and [B], and uniform impregnation was not performed because the melt-stability of the components differed during impregnation. Thus, the impregnating property was inferior.

Comparative Example 2

As shown in Table 1-2, an epoxy resin composition was prepared in the same manner as in Example 1 except that the component [A] used was 40 parts by mass of the biphenyl epoxy resin "jER (registered trademark)" YX4000, the other epoxy resin was 60 parts by mass of the bisphenol A epoxy resin "YD-128", and the component [B] used was 42 parts by mass of 4,4'-diamino-3,3',5,5'-tetraethyldiphenylmethane "Lonzacure (registered trademark)" M-DEA. This resin composition had a complex viscosity at 25° C. of $3.0 \times 10^5$ Pa·s, was sticky at room temperature, and was inferior in handleability because its shape was deformed. The glass transition temperature of the epoxy resin cured product obtained by curing this resin composition was 160° C., the resin toughness was 0.6 MPa·m$^{1/2}$, and the epoxy resin cured product was slightly inferior in resin toughness. The fiber-reinforced composite material produced by using the preform composed of the dry reinforcing-fiber base using this resin composition was excellent in impregnating property.

Comparative Example 3

As shown in Table 1-2, an epoxy resin composition was prepared in the same manner as in Example 1 except that the component [A] used was 55 parts by mass of the biphenyl epoxy resin "jER (registered trademark)" YX4000, the other epoxy resin was 45 parts by mass of the bisphenol A epoxy resin "jER" (registered trademark) 1001, and the component [B] used was 31 parts by mass of 4,4'-diamino-3,3',5,5'-tetraethyldiphenylmethane "Lonzacure (registered trademark)" M-DEA. This resin composition had a complex viscosity at 25° C. of 7.0×10$^7$ Pa·s, and was excellent in handleability at room temperature. The glass transition temperature of the epoxy resin cured product obtained by curing this resin composition was 154° C., the resin toughness was 0.6 MPa·m$^{1/2}$, and the epoxy resin cured product was slightly inferior in resin toughness. The fiber-reinforced composite material produced by using the preform composed of the dry reinforcing-fiber base using this resin composition had a high viscosity of the resin composition due to glassy solid bisphenol A epoxy at room temperature, and was inferior in impregnating property.

Comparative Example 4

As shown in Table 1-2, an epoxy resin composition was prepared in the same manner as in Example 1 except that the component [A] used was 100 parts by mass of the biphenyl epoxy resin "jER (registered trademark)" YX4000, the component [B] used was 8 parts by mass of 4,4'-diamino-3,3',5,5'-tetraethyldiphenylmethane "Lonzacure (registered trademark)" M-DEA, and the other hardener was 49 parts by mass of "Bisphenol A". This resin composition had a complex viscosity at 25° C. of 3.0×10$^8$ Pa·s, and was excellent in handleability at room temperature. The glass transition temperature of the epoxy resin cured product obtained by curing this resin composition was 123° C., the resin toughness was 0.5 MPa·m$^{1/2}$, and the epoxy resin cured product was inferior in heat resistance and toughness. The fiber-reinforced composite material produced by using the preform composed of the dry reinforcing-fiber base using this resin composition had sufficient impregnating property.

TABLE 1-1

|  |  |  | Melting point [° C.] | Example 1 | Example 2 | Example 3 | Example 4 | Example 5 |
|---|---|---|---|---|---|---|---|---|
| Component [A] Crystalline epoxy resin | Biphenyl epoxy resin | YX4000 | 105 | 100 |  |  |  |  |
|  | Biphenyl epoxy resin | YL6121H | 120 |  | 100 |  |  |  |
|  | Phenylene ether type epoxy resin | YSLV-80DE | 82 |  |  | 100 |  |  |
|  | Bisphenol F epoxy resin | YSLV-80XY | 81 |  |  |  | 100 |  |
|  | Hydroquinone type epoxy resin | YDC-1312 | 142 |  |  |  |  | 100 |
|  | Terephthalic acid type epoxy resin | EX-711 | 106 |  |  |  |  |  |
|  | Isocyanurate epoxy resin | TEPIC-S | 110 |  |  |  |  |  |
| Other epoxy resin | Bisphenol A epoxy resin | YD-128 | — |  |  |  |  |  |
|  | Bisphenol A epoxy resin | 1001 | — |  |  |  |  |  |
| Component [B] Crystalline amine hardener | 4,4'-Diamino-3,3',5,5'-tetraethyldiphenylmethane | M-DEA | 89 | 42 |  | 45 | 40 | 44 |
|  | 3,3'-Diaminodiphenyl sulfone | 3,3'-DAS | 170 |  | 35 |  |  |  |
|  | 1,3-Bis[2-(4-aminophenyl)-2-propyl] benzene | Bisaniline M | 114 |  |  |  |  |  |
|  | 9,9'-Bis(4-amino-3-chlorophenyl) fluorene | CAF | 201 |  |  |  |  |  |
| Other hardener | 4,4'-Isopropyridene diphenol | Bisphenol A | 158 |  |  |  |  |  |
| Component [C] Crystalline curing accelerator | 4-tert-Butylcatechol | DIC-TBC | 53 |  |  |  |  |  |
| Resin properties | Content [% by mass] of crystalline component |  |  | 100 | 100 | 100 | 100 | 100 |
|  | Difference [° C.] in melting point between component [A] and component [B] |  |  | 16 | 50 | 7 | 8 | 53 |
|  | Number of moles of active hydrogen/number of moles of epoxy group [—] |  |  | 1.00 | 1.00 | 1.00 | 1.00 | 1.00 |
|  | Complex viscosity η* [Pa · s] at 25° C. |  |  | 3.0 × 10$^8$ | 3.0 × 10$^8$ | 3.0 × 10$^8$ | 3.0 × 10$^8$ | 3.0 × 10$^8$ |
|  | Glass transition temperature X [° C.] of cured product |  |  | 187 | 181 | 140 | 176 | 180 |
|  | Rubbery state elastic modulus Y [MPa] of cured product |  |  | 27 | 15 | 31 | 25 | 23 |
|  | Formula (1): 0.25X − 37 < Y ≤ 0.25X − 19 |  |  | 10 ≤ Y ≤ 28 | 8 ≤ Y ≤ 26 | −2 ≤ Y ≤ 16 | 7 ≤ Y ≤ 25 | 8 ≤ Y ≤ 26 |
|  | Resin toughness of cured product [MPa · m$^{1/2}$] |  |  | 0.8 | 1.1 | 0.6 | 0.7 | 0.7 |
| Composite material properties | Resin impregnating property |  |  | A | A | A | A | B |

TABLE 1-1-continued

|  |  |  | Melting point [° C.] | Example 6 | Example 7 | Example 8 | Example 9 |
|---|---|---|---|---|---|---|---|
| Component [A] Crystalline epoxy resin | Biphenyl epoxy resin | YX4000 | 105 |  |  |  |  |
|  | Biphenyl epoxy resin | YL6121H | 120 |  |  | 100 |  |
|  | Phenylene ether type epoxy resin | YSLV-80DE | 82 |  |  |  |  |
|  | Bisphenol F epoxy resin | YSLV-80XY | 81 |  |  |  |  |
|  | Hydroquinone type epoxy resin | YDC-1312 | 142 |  |  |  | 100 |
|  | Terephthalic acid type epoxy resin | EX-711 | 106 | 100 |  |  |  |
|  | Isocyanurate epoxy resin | TEPIC-S | 110 |  | 100 |  |  |
| Other epoxy resin | Bisphenol A epoxy resin | YD-128 | — |  |  |  |  |
|  | Bisphenol A epoxy resin | 1001 | — |  |  |  |  |
| Component [B] Crystalline amine hardener | 4,4'-Diamino-3,3',5,5'-tetraethyldiphenylmethane | M-DEA | 89 | 53 | 79 |  |  |
|  | 3,3'-Diaminodiphenyl sulfone | 3,3'-DAS | 170 |  |  |  |  |
|  | 1,3-Bis[2-(4-aminophenyl)-2-propyl] benzene | Bisaniline M | 114 |  |  | 49 |  |
|  | 9,9'-Bis(4-amino-3-chlorophenyl) fluorene | CAF | 201 |  |  |  | 59 |
| Other hardener | 4,4'-Isopropyridene diphenol | Bisphenol A | 158 |  |  |  |  |
| Component [C] Crystalline curing accelerator | 4-tert-Butylcatechol | DIC-TBC | 53 |  |  |  |  |
| Resin properties | Content [% by mass] of crystalline component |  |  | 100 | 100 | 100 | 100 |
|  | Difference [° C.] in melting point between component [A] and component [B] |  |  | 17 | 21 | 9 | 59 |
|  | Number of moles of active hydrogen/number of moles of epoxy group [—] |  |  | 1.00 | 1.00 | 1.00 | 1.00 |
|  | Complex viscosity $\eta^*$ [Pa · s] at 25° C. |  |  | $3.0 \times 10^8$ | $3.0 \times 10^8$ | $3.0 \times 10^8$ | $3.0 \times 10^8$ |
|  | Glass transition temperature X [° C.] of cured product |  |  | 179 | 263 | 181 | 200 |
|  | Rubbery state elastic modulus Y [MPa] of cured product |  |  | 24 | 50 | 19 | 13 |
|  | Formula (1): $0.25X - 37 < Y \le 0.25X - 19$ |  |  | $8 \le Y \le 26$ | $29 \le Y \le 47$ | $8 \le Y \le 26$ | $13 \le Y \le 31$ |
|  | Resin toughness of cured product [MPa · m$^{1/2}$] |  |  | 0.8 | 0.6 | 1.2 | 0.9 |
| Composite material properties | Resin impregnating property |  |  | A | A | A | B |

TABLE 1-2

|  |  |  | Melting point [° C.] | Example 10 | Example 11 | Example 12 | Example 13 | Example 14 | Example 15 | Example 16 |
|---|---|---|---|---|---|---|---|---|---|---|
| Component [A] Crystalline epoxy resin | Biphenyl epoxy resin | YX4000 | 105 |  |  |  |  | 100 | 100 | 80 |
|  | Biphenyl epoxy resin | YL6121H | 120 | 100 | 100 | 100 | 100 |  |  |  |
|  | Phenylene ether type epoxy resin | YSLV-80DE | 82 |  |  |  |  |  |  |  |
|  | Bisphenol F epoxy resin | YSLV-80XY | 81 |  |  |  |  |  |  |  |
|  | Hydroquinone type epoxy resin | YDC-1312 | 142 |  |  |  |  |  |  |  |
|  | Terephthalic acid type epoxy resin | EX-711 | 106 |  |  |  |  |  |  |  |
|  | Isocyanurate epoxy resin | TEPIC-S | 110 |  |  |  |  |  |  |  |
| Other epoxy resin | Bisphenol A epoxy resin | YD-128 | — |  |  |  |  |  |  |  |
|  | Bisphenol A epoxy resin | 1001 | — |  |  |  |  |  |  | 20 |
| Component [B] Crystalline amine hardener | 4,4'-Diamino-3,3',5,5'-tetraethyldiphenylmethane | M-DEA | 89 |  |  |  |  | 42 | 42 | 37 |
|  | 3,3'-Diaminodiphenyl sulfone | 3,3'-DAS | 170 | 39 | 44 | 53 | 62 |  |  |  |
|  | 1,3-Bis[2-(4-aminophenyl)-2-propyl] benzene | Bisaniline M | 114 |  |  |  |  |  |  |  |
|  | 9,9'-Bis(4-amino-3-chlorophenyl) fluorene | CAF | 201 |  |  |  |  |  |  |  |
| Other hardener | 4,4'-Isopropyridene diphenol | Bisphenol A | 158 |  |  |  |  |  |  |  |
| Component [C] Crystalline curing accelerator | 4-tert-Butylcatechol | DIC-TBC | 53 |  |  |  |  |  | 3 | 5 |
| Resin properties | Content [% by mass] of crystalline component |  |  | 100 | 100 | 100 | 100 | 100 | 100 | 85 |
|  | Difference [° C.] in melting point between component [A] and component [B] |  |  | 50 | 50 | 50 | 50 | 16 | 16 | 16 |
|  | Number of moles of active hydrogen/number of moles of epoxy group [—] |  |  | 1.10 | 1.25 | 1.50 | 1.75 | 1.00 | 1.00 | 1.00 |
|  | Complex viscosity $\eta^*$ [Pa · s] at 25° C. |  |  | $3.0 \times 10^8$ | $3.0 \times 10^8$ | $3.0 \times 10^8$ | $3.0 \times 10^8$ | $3.0 \times 10^8$ | $3.0 \times 10^8$ | $3.0 \times 10^8$ |

TABLE 1-2-continued

| | | | | | | | | |
|---|---|---|---|---|---|---|---|---|
| | Glass transition temperature X [° C.] of cured product | | 179 | 169 | 155 | 135 | 180 | 170 | 180 |
| | Rubbery state elastic modulus Y [MPa] of cured product | | 13 | 10 | 5 | 2 | 26 | 23 | 24 |
| | Formula (1): 0.25X − 37 < Y ≤ 0.25X − 19 | | 8 ≤ Y ≤ 26 | 5 ≤ Y ≤ 23 | 2 ≤ Y ≤ 20 | −3 ≤ Y ≤ 20 | 8 ≤ Y ≤ 26 | 6 ≤ Y ≤ 24 | 8 ≤ Y ≤ 26 |
| | Resin toughness of cured product [MPa · m$^{1/2}$] | | 1.2 | 1.5 | 1.3 | 1.0 | 0.7 | 0.7 | 0.8 |
| Composite material properties | Resin impregnating property | | A | A | A | A | A | A | A |

| | | | Melting point [° C.] | Example 17 | Comparative Example 1 | Comparative Example 2 | Comparative Example 3 | Comparative Example 4 |
|---|---|---|---|---|---|---|---|---|
| Component [A] Crystalline epoxy resin | Biphenyl epoxy resin | YX4000 | 105 | 70 | | 40 | 55 | 100 |
| | Biphenyl epoxy resin | YL6121H | 120 | | | | | |
| | Phenylene ether type epoxy resin | YSLV-80DE | 82 | | 100 | | | |
| | Bisphenol F epoxy resin | YSLV-80XY | 81 | | | | | |
| | Hydroquinone type epoxy resin | YDC-1312 | 142 | | | | | |
| | Terephthalic acid type epoxy resin | EX-711 | 106 | | | | | |
| | Isocyanurate epoxy resin | TEPIC-S | 110 | | | | | |
| Other epoxy resin | Bisphenol A epoxy resin | YD-128 | — | | | 60 | | |
| | Bisphenol A epoxy resin | 1001 | — | 30 | | | 45 | |
| Component [B] Crystalline amine hardener | 4,4'-Diamino-3,3',5,5'-tetraethyldiphenylmethane | M-DEA | 89 | 34 | | 42 | 31 | 8 |
| | 3,3'-Diaminodiphenyl sulfone | 3,3'-DAS | 170 | | 35 | | | |
| | 1,3-Bis[2-(4-aminophenyl)-2-propyl] benzene | Bisaniline M | 114 | | | | | |
| | 9,9'-Bis(4-amino-3-chlorophenyl) fluorene | CAF | 201 | | | | | |
| Other hardener | 4,4'-Isopropyridene diphenol | Bisphenol A | 158 | | | | | 49 |
| Component [C] Crystalline curing accelerator | 4-tert-Butylcatechol | DIC-TBC | 53 | | | | | |
| Resin properties | Content [% by mass] of crystalline component | | | 78 | 100 | 58 | 66 | 100 |
| | Difference [° C.] in melting point between component [A] and component [B] | | | 16 | 88 | 16 | 16 | 53 |
| | Number of moles of active hydrogen/number of moles of epoxy group [—] | | | 1.00 | 1.00 | 1.00 | 1.00 | 1.00 |
| | Complex viscosity η* [Pa · s] at 25° C. | | | 2.0 × 10$^8$ | 3.0 × 10$^8$ | 3.0 × 10$^5$ | 7.0 × 10$^7$ | 3.0 × 10$^8$ |
| | Glass transition temperature X [° C.] of cured product | | | 169 | 148 | 160 | 154 | 123 |
| | Rubbery state elastic modulus Y [MPa] of cured product | | | 20 | 30 | 16 | 15 | 3 |
| | Formula (1): 0.25X − 37 < Y ≤ 0.25X − 19 | | | 6 ≤ Y ≤ 24 | 0 ≤ Y ≤ 18 | 3 ≤ Y ≤ 21 | 2 ≤ Y ≤ 20 | −6 ≤ Y ≤ 12 |
| | Resin toughness of cured product [MPa · m$^{1/2}$] | | | 0.8 | 0.6 | 0.6 | 0.6 | 0.5 |
| Composite material properties | Resin impregnating property | | | B | C | A | C | B |

The epoxy resin composition for fiber-reinforced composite materials of the present invention has excellent handleability at room temperature, does not require an auxiliary material at the time of resin preparation, reduces resin loss, and has excellent impregnating property into reinforcing fibers, and it is possible to more easily provide a high-quality fiber-reinforced composite material with high productivity by a press forming method or the like. In addition, because of its excellent heat resistance and toughness, the fiber-reinforced composite material is being applied especially to automobile applications and aircraft applications, and further weight reduction can be expected to contribute to improved fuel efficiency and reduction of global warming gas emissions.

The invention claimed is:

1. An epoxy resin cured product obtained by curing an epoxy resin composition for fiber-reinforced composite materials comprising a crystalline epoxy resin as component [A], 20% by mass or more of a crystalline amine hardener as component [B] and 80% by mass or more of a crystalline component in 100% by mass of the epoxy resin composition, wherein a difference between the component [A] and component [B] melting points is 0 to 50° C.,
component [A] comprises at least one selected from the group consisting of biphenyl epoxy resin, naphthalene epoxy resin, anthracene epoxy resin, hydroquinone epoxy resin, thioether epoxy resin, phenylene ether epoxy resin, tris hydroxyphenyl methane epoxy resin, terephthalic acid epoxy resin, isocyanurate epoxy resin, phthalimide epoxy resin, and tetraphenylethane epoxy resin, and wherein the epoxy resin cured product has
a glass transition temperature X (° C.) and a rubbery state elastic modulus Y (MPa) satisfying the following formula (1):

$$0.25X-37 \leq Y \leq 0.25X-19 \quad (1)$$

and a glass transition temperature X (° C.) that is higher than 170° C.

2. The epoxy resin composition for fiber-reinforced composite materials according to claim 1, wherein component [A] contains a bifunctional crystalline epoxy resin.

3. The epoxy resin composition for fiber-reinforced composite materials according to claim 2, wherein component

[A] contains one or more crystalline epoxy resins selected from the group consisting of biphenyl epoxy resin and bisphenol epoxy resin.

4. The epoxy resin composition for fiber-reinforced composite materials according to claim 1, wherein component [B] contains a bifunctional crystalline amine hardener.

5. The epoxy resin composition for fiber-reinforced composite materials according to claim 1, wherein the number of moles of active hydrogen contained in component [B] is 1.05 to 1.70 times the number of moles of epoxy groups contained in the entire epoxy resin composition.

6. The epoxy resin composition for fiber-reinforced composite materials according to claim 1, further comprising a crystalline curing accelerator as a component [C].

7. A preform comprising the epoxy resin composition for fiber-reinforced composite materials according to claim 1 and a dry reinforcing-fiber base.

8. A fiber-reinforced composite material obtained by impregnating and curing the preform according to claim 7, wherein the epoxy resin composition cures to form an epoxy resin cured product.

9. The epoxy resin composition for fiber-reinforced composite materials according to claim 1, wherein component [A] comprises at least one selected from the group consisting of biphenyl epoxy resin, hydroquinone epoxy resin, phenylene ether epoxy resin, terephthalic acid epoxy resin, and isocyanurate epoxy resin.

10. The epoxy resin composition for fiber-reinforced composite materials according to claim 1, wherein component [A] comprises biphenyl epoxy resin.

11. A fiber-reinforced composite material obtained by impregnating and curing a preform comprising an epoxy resin composition for fiber-reinforced composite materials and a dry reinforcing-fiber base, wherein the epoxy resin composition cures to form an epoxy resin cured product,
wherein
the epoxy resin composition for fiber-reinforced composite materials comprises a crystalline epoxy resin as component [A], 20% by mass or more of a crystalline amine hardener as component [B] and 80% by mass or more of a crystalline component in 100% by mass of the epoxy resin composition, wherein
a difference between the component [A] and component [B] melting points is 0 to 50° C. and
component [A] comprises at least one selected from the group consisting of biphenyl epoxy resin, naphthalene epoxy resin, anthracene epoxy resin, hydroquinone epoxy resin, thioether epoxy resin, phenylene ether epoxy resin, tris hydroxyphenyl methane epoxy resin, terephthalic acid epoxy resin, isocyanurate epoxy resin, phthalimide epoxy resin, and tetraphenylethane epoxy resin,
wherein the epoxy resin cured product has
a glass transition temperature X (° C.) and a rubbery state elastic modulus Y (MPa) satisfying the following formula (1): $0.25X-37 \leq Y \leq 0.25X-19$ ... (1) and
a glass transition temperature X (° C.) that is higher than 170° C.

* * * * *